April 18, 1967

J. A. RIETDIJK 3,314,594

APPARATUS FOR COMPRESSING OR EXPANDING A MEDIUM, WHICH
APPARATUS INCLUDES A CONTROL DEVICE FOR REGULATING
THE AMOUNT OF DEAD SPACE

Filed Sept. 30, 1964

INVENTOR.
JOHAN A. RIETDIJK
BY
Frank R. Trifari
AGENT

April 18, 1967   J. A. RIETDIJK   3,314,594
APPARATUS FOR COMPRESSING OR EXPANDING A MEDIUM, WHICH
APPARATUS INCLUDES A CONTROL DEVICE FOR REGULATING
THE AMOUNT OF DEAD SPACE
Filed Sept. 30, 1964   4 Sheets-Sheet 3

INVENTOR.
JOHAN A. RIETDIJK
BY
AGENT

April 18, 1967 J. A. RIETDIJK 3,314,594
APPARATUS FOR COMPRESSING OR EXPANDING A MEDIUM, WHICH
APPARATUS INCLUDES A CONTROL DEVICE FOR REGULATING
THE AMOUNT OF DEAD SPACE
Filed Sept. 30, 1964 4 Sheets-Sheet 4

INVENTOR.
JOHAN A. RIETDIJK
BY
AGENT 3,314,594
APPARATUS FOR COMPRESSING OR EXPANDING A MEDIUM, WHICH APPARATUS INCLUDES A CONTROL DEVICE FOR REGULATING THE AMOUNT OF DEAD SPACE
Johan Adriaan Rietdijk, Emmasingel, Eindhoven, Netherlands, assignor to North American Philips Company, Inc., New York, N.Y., a corporation of Delaware
Filed Sept. 30, 1964, Ser. No. 400,394
Claims priority, application Netherlands, Oct. 25, 1963, 299,785
7 Claims. (Cl. 230—21)

The invention relates to an apparatus for compressing or expanding of a medium, which apparatus includes at least one cylinder in which a piston-shaped member is arranged to reciprocate to vary the volume of a working space. The apparatus further includes a control device for controlling the relative volume variations of the working space by regulation of the amount of dead space.

Apparatus of the kind to which the present invention relates are, for example, compressors, expansion machines, cold-gas refrigerators, hot-gas reciprocating engines, and so on. In these machines it is frequently desirable for the delivery, the extent of the expansion, the absorption of thermal energy or the power output to be controllable. A known method of controlling these quantities is the addition of dead space.

Known apparatus provided with a control device for adding dead space, however, all have a comparatively complicated construction comprising many moving parts so that the likelihood of leakage occurring and impurities penetrating to the working space is increased.

It is an object of the invention to obviate the said disadvantages, and the invention is characterized in that the piston-shaped member capable of varying the volume of the working space, on the side remote from this space, engages a column of liquid which is contained in the cylinder and engages a second piston-shaped member mechanically coupled to the driving means, at least the seal between the first-mentioned piston-shaped member and the wall of the cylinder being in the form of at least one rolling diaphragm, the or each diaphragm being supported on at least one side by liquid, control devices being provided for maintaining across the or each rolling diaphragm a pressure difference which is substantially constant at least at each stroke and is always directed in the same sense, while the space between the two piston-shaped members which contains the column of liquid is provided with an inlet and an outlet for liquid, enabling the amount of liquid in this space to be varied.

By providing a greater or lesser amount of liquid in the space between the two piston-shaped members the spacing between these members can be varied. Surprisingly, whilst maintaining the length of the stroke of the two piston-shaped members the place of the stroke of the piston-shaped member varying the volume of the working space can be shifted. This provides an extremely simple control for adding dead space whilst retaining the compact and robust construction of the apparatus.

A further advantage of the apparatus in accordance with the invention consists in that the use of a rolling diaphragm ensures complete sealing of the working space. As a result lubricant particles or other impurities are prevented from penetrating to the working space past the piston.

By the use of a liquid support for the rolling diaphragm, in contradistinction to known rolling diaphragm constructions, high pressures are permissible in the working space without the useful life of the rolling diaphragm being adversely affected.

By using a rolling diaphragm as a sealing member the piston may have a comparatively large stroke many times greater than the stroke permissible, for example, in known diaphragm compressors.

In known apparatus of the kind to which the present invention relates the cooling of the working piston provides difficulty. In the apparatus in accordance with the invention this difficulty is completely removed since the liquid between the two piston-shaped members may be regularly renewed. Owing to this flushing action the heat of the piston-shaped member varying the working space will be conducted away together with the liquid. This provides particularly satisfactory cooling of this piston, resulting in satisfactory cooling of the rolling diaphragm also which engages this piston through a large part of its area. Hence the useful life of the rolling diaphragm is prolonged.

As has been mentioned hereinbefore, a control device is provided to maintain a substantially constant pressure difference across the rolling diaphragm at all times so as to maintain the rolling diaphragm in the stretched condition. It depends upon the position of the rolling diaphragm whether the pressure in the supporting liquid should be greater or smaller than that in the working space. When the concave side of the rolling diaphragm faces the working space the pressure in the liquid must be lower than that in the working space. This means that in the working space no pressures of about 1 atmosphere are permissible. Especially in compressors, frequently medium must be induced into the working space at pressures below atmospheric pressure.

For this purpose a preferred embodiment of an apparatus in accordance with the invention in the form of a compressor is characterized in that the rolling diaphragm one side of which forms part of the boundary of the working space faces this space with its convex side. If only a single rolling diaphragm is provided as a seal, in a further embodiment of the apparatus in accordance with the invention the piston-shaped member capable of varying the volume of the working space is acted upon by at least one resilient member exerting forces on the piston-shaped member which are directed towards the column of liquid.

When the rolling diaphragm faces the working space with its convex side, the pressure in the supporting liquid will always be greater than the pressure in the working space. Consequently the pressure in the working space may be low without giving rise to difficulty.

Another advantage of a rolling diaphragm facing the working space with its convex side is that always only a small portion of the surface of the diaphragm is in contact with the medium in the working space. On a movement of the piston the rolling diaphragm will roll over the walls of the piston and the cylinder so that at each instant a different portion of the rolling diaphragm contacts the medium in the working space. This provides a great advantage, especially in compressors, where the medium may become very hot. The part of the rolling diaphragm which at a given instant is in contact with very hot medium will the next instant engage the cool wall of the piston or the cylinder to which it transfers its heat. This prevents excessive heating of the rolling diaphragm.

A further advantageous embodiment of an apparatus in accordance with the invention is characterized in that the piston-shaped member capable of varying the volume of the working space is so shaped that under the rolling diaphragm a space is produced which is separated from the column of liquid between the two piston-shaped members, while on movement of the piston relative to the cylinder this separate space is not subjected to volume variations owing only to the shape of the cooperating wall portions of the piston and the cylinder, this space being connected to a control device which ensures that at least during each stroke the pressure in the liquid contained in the separate space differs from the pressure in the working space by a substantially constant amount.

An advantageous embodiment of the apparatus in accordance with the invention is further characterized in that between the piston-shaped member capable of varying the volume of the working space and the wall of the cylinder there is an interstice in which a rolling diaphragm is provided as a sealing member, one side of this rolling diaphragm forming part of the boundary of the working space while the other side engages the column of liquid between the two piston-shaped members, the apparatus including at least one resilient member by which on the piston-shaped member capable of varying the volume of the working space such forces are exerted that across the rolling diaphragm a pressure difference is produced directed towards the convex side of this diaphragm, a control device keeping the pressure difference across this member substantially constant at least during each stroke. In a further embodiment of this apparatus the cooperating wall portions of the second piston-shaped member and the cylinder are stepped in a manner such that the areas of the resulting annular surfaces are equal. Thus, on movement of the two piston-shaped members the volume between them remains constant without the rolling diaphragm having to be subjected to a change in length.

In a further embodiment of the apparatus in accordance with the invention two rolling diaphragms are provided in the interstice between the first piston-shaped member and the wall of the cylinder, the space between these rolling diaphragms also being filled with liquid while a control device is provided which ensures that the pressure in the liquid between the rolling diaphragms always differs from the pressure in the working space by a constant amount.

In a further advantageous embodiment of the apparatus in accordance with the invention is in the form of a compressor comprising at least two cylinders, the outlet of the first cylinder being connected by a pipe to the inlet of the second cylinder. This apparatus is characterized in that in the first cylinder the seal between the piston capable of varying the volume of the working space and the wall of the cylinder is in the form of at least one rolling diaphragm the convex side of which faces the working space, while in the second cylinder the seal between the piston capable of varying the volume of the compression space and the wall of the cylinder is in the form of at least one rolling diaphragm the concave side of which faces the working space, the spaces under the rolling diaphragms in the first and second cylinders communicating through a narrow pipe, while the apparatus includes a single control device which is connected to these two spaces and maintains the same mean pressure in these spaces, this mean pressure being higher than the mean pressure occurring in the compression space of the first cylinder and lower than the mean pressure occurring in the compression space of the second cylinder.

A further advantageous embodiment of the apparatus in accordance with the invention, which includes two working spaces situated in a cylinder, is characterized in that the apparatus includes a double-acting piston-shaped member which is coupled to a driving means and the piston surfaces of which each engage a column of liquid, the end of each column remote from the said piston-shaped member engaging a further piston-shaped member, each of these further piston-shaped members being capable of varying the volume of one of the working spaces, the seal between the further piston-shaped members and the wall of the cylinder being in the form of at least one rolling diaphragm, means being provided to maintain a substantially constant pressure difference across these rolling diaphragms, while the spaces between each of the further piston-shaped members and the piston-shaped member coupled to the driving means is provided with an inlet and an outlet for liquid which enable the amount of liquid in each of these spaces to be varied.

Thus, a readily controllable double-acting apparatus is obtained.

The invention will now be described more fully with reference to the accompanying drawings, which show schematically embodiments of apparatus in accordance with the invention and in which.

Figure 1:
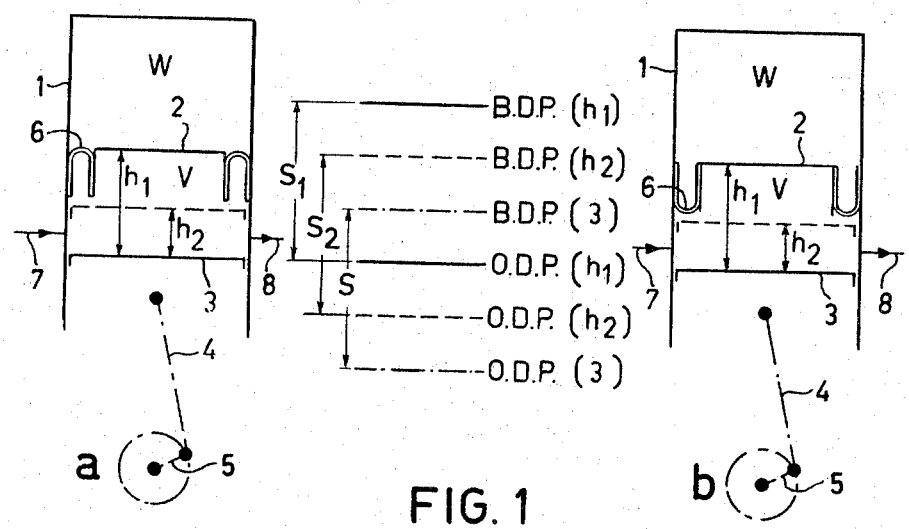
FIGURE 1 shows diagrammatically the principle underlying the invention.

Referring now to FIGURE 1, two piston-shaped members 2 and 3 are arranged to reciprocate in a cylinder 1. The piston 3 is coupled to a crank 5 by a connecting rod 4. The seal between the cylinder 1 and the piston 2 is in the form of a rolling diaphragm 6. Above the piston 2 is a working space W while a space V between the pistons 2 and 3 is filled with liquid. A liquid supply pipe 7 and a liquid discharge pipe 8 are connected to this liquid-filled space V. In the embodiment of FIGURE 1$a$ the convex side of the rolling diaphragm 6 faces the working space W, and in FIGURE 1$b$ the concave side of the rolling diaphragm faces this space. This does not affect the principle of the regulation.

During operation the piston 3 moves between its extreme positions O.D.P. 3 and B.D.P. 3, as is shown in the figure. Thus the piston has a stroke S. When the height of the column of liquid in the space V has a value $h_1$, the piston 2 moves between its extreme positions, which in the figure are indicated by O.D.P. ($h_1$) and B.D.P. ($h_1$). Thus, the stroke of this piston is $S_1$, which is substantially equal to the stroke S of the piston 3. If dead space is to be added, liquid may be discharged from the space V through the liquid outlet 8. As a result the height of the column of liquid in the space V becomes equal to $h_2$. As is indicated in the figure, in this event the piston 2 moves between its extreme positions O.D.P. ($h_2$) and B.D.P. ($h_2$). Now the piston 2 has a stroke $S_2$. This stroke $S_2$ is exactly equal to the stroke $S_1$. Consequently the stroke length has not changed. However, the area in which the stroke is performed is shifted slightly downward. This means that the amount of dead space is increased. If the amount of dead space is to be reduced, additional liquid may be supplied to the space V through the liquid inlet 7, so that the height of the column of liquid increases and the area in which the stroke is performed is shifted upward.

Figure 2:
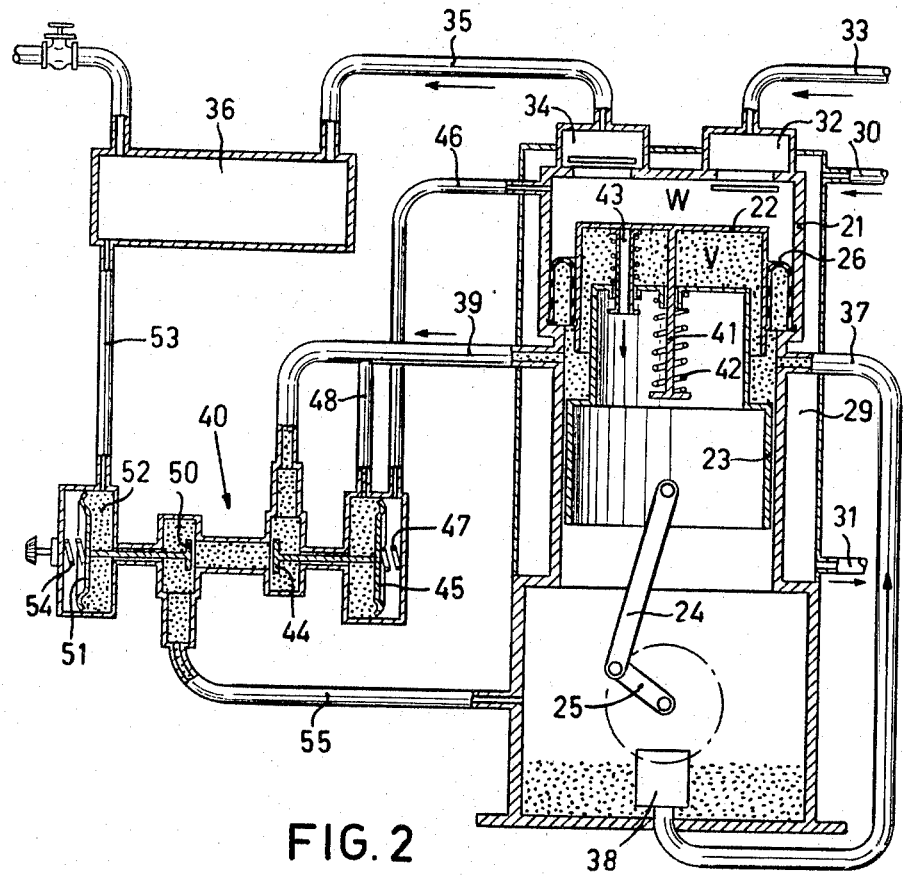
FIGURES 2 to 5 show schematically some apparatus in accordance with the invention in the form of compressors.

FIGURE 2 shows a compressor including a cylinder 21 in which two piston-shaped members 22 and 23 are arranged to reciprocate. The seal between the piston 22 and the cylinder 21 is in the form of a rolling diaphragm 26. The piston 23 is connected to a crank 25 by a connecting rod 24. The cylinder 21 is surrounded by a jacket 29 for cooling-water to which are connected a supply pipe 30 and a discharge pipe 31 for cooling-water. The compression space W is connected through an inlet valve 32 to a pipe 33 for supplying medium and through an outlet valve 34 to a pipe 35 for discharging medium. The medium supply pipe 35 opens into a buffer space 36. The space V between the pistons 22 and 23 is filled with liquid. A pipe 37 for supplying liquid is connected to this space. The other end of the liquid supply pipe 37 is connected to a liquid pump 38. The space V is also provided with a pipe 39 for discharging liquid which opens into a control device 40. The piston 22 is provided with a guiding rod 41 which is surrounded by a compression spring 42 which continuously presses the piston 22 against the liquid in the space V. The apparatus further includes a control valve 43 which determines the maximum height of the column of liquid in the space V.

The control device 40 includes a valve 44 capable of closing the pipe 39 for supplying liquid. The valve 44 is coupled to a diaphragm 45. A space to the right of this diaphragm communicates with the space W through a pipe 46. A compression spring 47 exerts pressure on the right-hand surface of the diaphragm. The space to the left of the diaphragm 45 communicates with the space V through a narrow pipe 48 and the pipe 39. Hence the same mean pressure difference is produced across the diaphragm 45 and across the rolling diaphragm 26. The compression spring 47 is so chosen that its pressure difference may rise to a value of several atmospheres before the valve 44 is opened.

The control device 40 includes a second valve 50. This valve 50 is coupled to a diaphragm 51. A space 52 to the right of the diaphragm 51 communicates with the buffer space 36 through a pipe 53. A spring 54 the force of which may be adjustable exerts pressure on the left-hand surface of the diaphragm 51.

The apparatus operates as follows:

The liquid pump 38 supplies liquid to the space V through the pipe 37. As a result the spacing between the pistons 22 and 23 increases. The valve 43 follows the upward movement of the piston 22 until its lower end strikes the piston 23. When the piston 22 rises slightly further, the upper end of the valve 43 no longer engages the piston 22, permitting the liquid to flow back through the valve 43 to the crank case. The piston 22 now has reached its extreme upper position. In this position the amount of dead space is a minimum and the delivery a maximum. The spring 42 ensures a pressure difference of a few atmospheres between the pressure in the liquid and the pressure in the working space W. Hence the rolling diaphragm 20 is always maintained in a stretched condition. In the extreme upper position the liquid pump continues to supply liquid which through the valve 43 is again discharged from the space V. This provides constant flushing of the space V. This is of advantage for two reasons. First, the concentration of any medium diffused through the rolling diaphragm into the liquid in the space V is prevented from becoming excessive. Secondly particularly satisfactory cooling of the piston 22 and the rolling diaphragm 26 is obtained.

When the pressure in the buffer space 26 becomes excessive, the delivery of the compressor of FIGURE 1 must decrease automatically. When the pressure in the buffer space 36 and hence in the space 52 becomes excessive, the diaphragm 51 is moved to the left against the pressure of the spring 54. As a result the valve 50 is lifted from its seat. In normal operation the valve 44 is always open. Thus liquid can now flow through the pipe 39 and the valve 50 into a return pipe 55. Consequently the spacing between the pistons 22 and 23 decreases, i.e. the amount of dead space increases and the delivery decreases.

The valve 44 is provided to prevent an excessive reduction of the pressure difference between the media in the spaces V and W. When this pressure difference is excessively reduced, the spring 47 by its pressure closes the valve 44 so that no more liquid is discharged from the space V.

Although in the apparatus of FIGURE 1 the valve 50 is automatically controlled by the pressure in space 36, as an alternative delivery may obviously be controlled manually or in accordance with the values of parameters other than the pressure in the buffer space.

Figure 3:
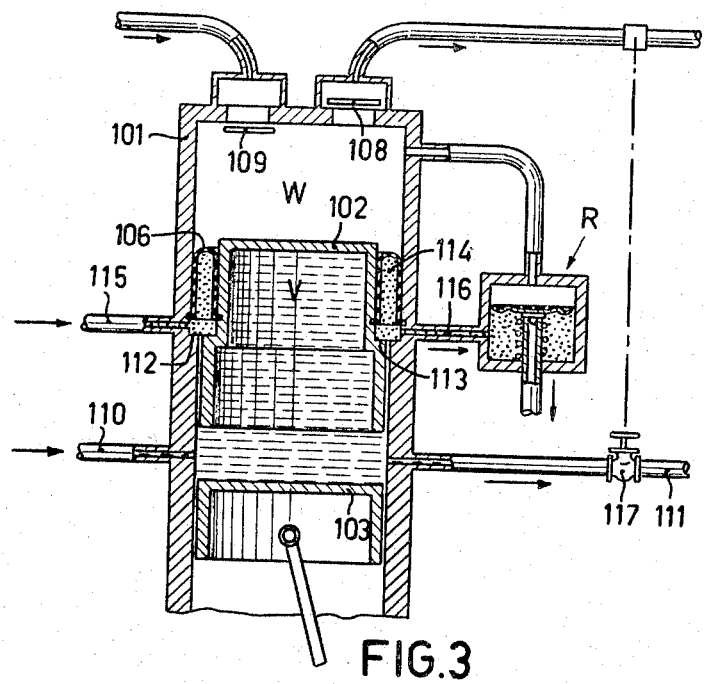

FIGURE 3 shows another embodiment of a compressor. This compressor includes a cylinder 101 and two piston-shaped members 102 and 103, the member 103 being mechanically coupled to a driving means (not shown). The seal between the piston 102 and the cylinder 101 is in the form of a rolling diaphragm 106.

Above the piston 102 is a working space W provided with an outlet valve 108 and an inlet valve 109. Between the pistons 102 and 103 is a space V which is filled with liquid and into which open a liquid supply pipe 110 and a liquid discharge pipe 111. The cylinder 101 and the piston 102 are stepped so that annular faces 112 and 113 are formed. The annular faces 112 and 113 are proportioned so that their areas are equal. By this stepped shape of the piston 102 and the cylinder 101 a space 114 separated from the space V is formed under the rolling diaphragm 106. This space 114 also contains a liquid and communicates with a liquid supply pipe 115 and a liquid discharge pipe 116. The discharge pipe 116 opens into a control device R. This control device R ensures that the pressure in the space 114 always exceeds the pressure in the working space W by a constant amount. The discharge pipe 111 connected to the space V contains a controllable valve 117 the position of which is determined by the pressure in the pipe for discharging the medium. If the pressure in this medium discharge pipe becomes excessive, the valve 117 is opened and the liquid is discharged from the space V. As a result the spacing between the pistons 102 and 103 decreases, which means that the amount of dead space is increased. As a result the delivery of the compressor will decrease and the pressure in the medium discharge pipe will fall off.

Figure 4:
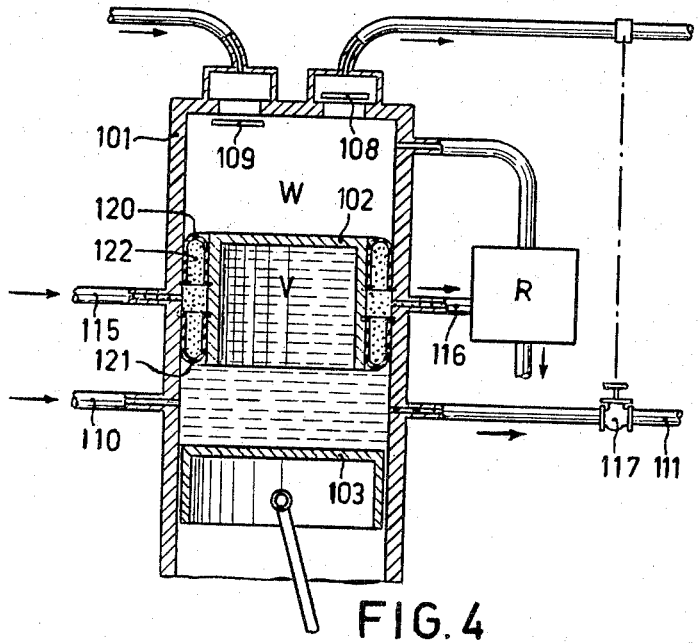

FIGURE 4 shows a compressor the main components of which are the same as in the compressors described with reference to the preceding figures, however, two rolling diaphragms 120 and 121 are provided as a seal between the piston 102 and the cylinder 101. Otherwise control is effected in a manner entirely similar to that described with reference to FIGURE 3. A remarkable feature of this arrangement is that in this compressor the pistons 102 and 103 need not be interconnected by springs. The pressure in the liquid in the space V may be the same as that in the space W. A higher pressure is maintained only in the space 122 between the rolling diaphragms in order to maintain them in a stretched condition. If rolling diaphragms are used the convex sides of which face one another, the pressure in the space 122 must be lower than in spaces V and W.

Figure 5:
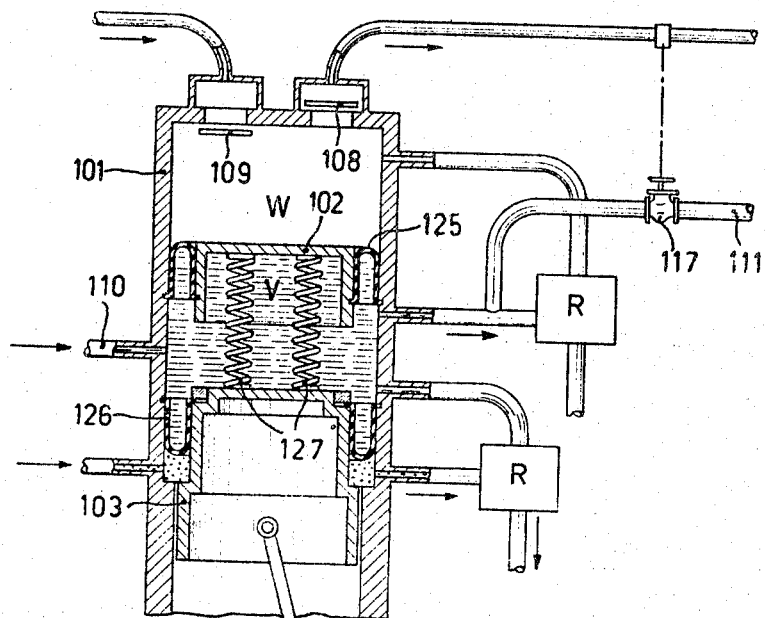

FIGURE 5 shows a further possible embodiment of a compressor. In this compressor, both the seal between the piston 102 and the wall of the cylinder and the seal between the piston 103 and the wall of the cylinder are constituted by rolling diaphragms 125 and 126, respectively. Between the pistons 102 and 103 resilient elements 127 are interposed to provide a correct pressure difference between the pressure in the liquid in the space V and the pressure of the medium in the space W. In this embodiment a control device R is required to maintain constant pressure differences across the rolling diaphragm 125 and across the rolling diaphragm 126.

Figure 6:
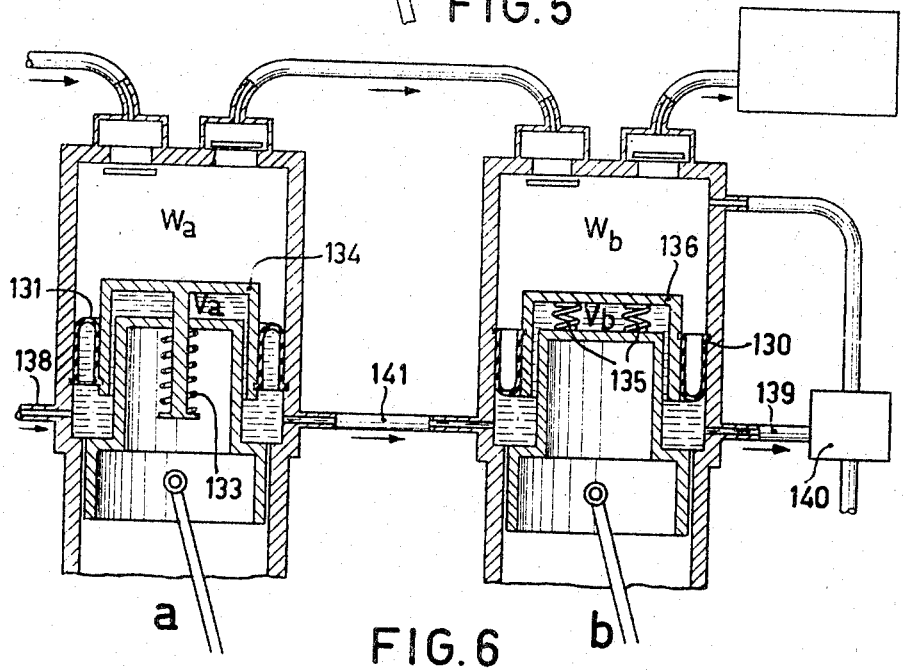
FIGURE 6 shows schematically a two-stage compressor.

FIGURE 6 shows two compressors connected in series. The first compressor A may be entirely similar to that of FIGURE 1 whilst the second compressor B differs therefrom only by the fact that the concave side instead of the convex side faces the space W. Since in the compressor A the convex side of the rolling diaphragm 131 faces the space Wa, the pressure of the liquid in the space Va must be higher than the pressure of the medium in space Wa. For this purpose a spring 133 is mounted so that forces directed towards the liquid are exerted on the piston 134. In the compressor B the concave side of the rolling diaphragm 130 faces the space Wb. Hence, to maintain this rolling diaphragm in a stretched condition the mean pressure of the liquid in the space Vb must be lower than that of the medium in the space Wb. For this purpose springs 135 are constructed as compression springs so that forces in a direction away from the liquid are exerted on the piston 136. If a mean pressure, of, for example, 2 atmospheres prevails in the space Wa, a mean pressure of 5 atmospheres in the space Va is sufficient to maintain the rolling diaphragm 131 in a stretched condition. If in the space Wb a mean pressure of 8 atmospheres prevails, a pressure of 5 atmospheres in the space Vb is sufficient to maintain the rolling diaphragm 130 in a stretched condition. Consequently it is sufficient to use a single pipe 138 for supplying liquid to the space Va and a single pipe 139 for discharging liquid from the space Vb, which liquid discharge pipe contains a control device 140 which may be entirely similar to the control device 40 of FIGURE 1. The spaces Va and Vb communicate through a small-diameter pipe 141.

Thus, a simple multistage compressor is obtained which incorporates a control of the delivery by addition of dead spaces.

Figure 7:
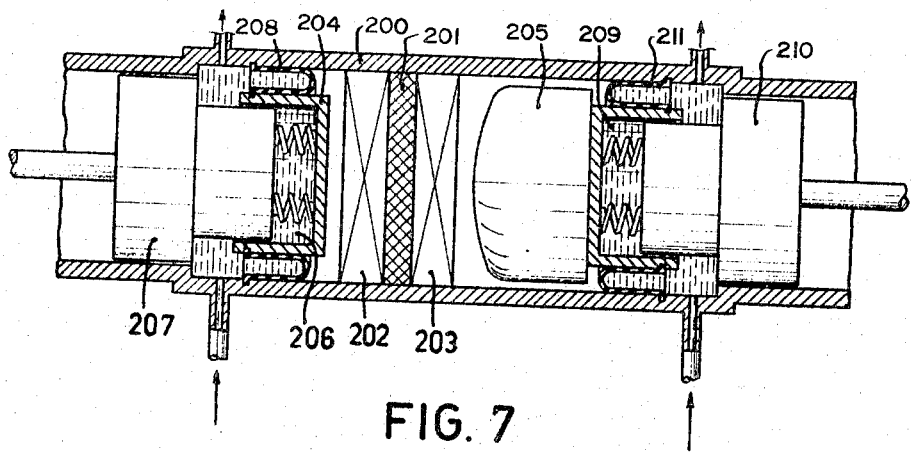
FIGURE 7 shows schematically a cold-gas refrigerator.

FIGURE 7 shows diagrammatically a cold-gas refrigerator. The main components of this machine are a cylinder 200 containing a regenerator 201, a cooler 202 and a freezer 203. A compression piston 204 and an expansion piston 205 are arranged to reciprocate in the cylinder 200 with a predetermined phase shift. The pistons may be driven in known manner (not shown). The side of the compression piston 204 remote from the working space engages a column of liquid 206 which in turn engages a piston 207. The seal between the piston 204 and the cylinder 200 is in the form of a rolling diaphragm 208.

Similarly to the compression piston the expansion piston engages a column of liquid 209 which in turn engages a piston 210. The seal between the piston 205 and the cylinder 200 is in the form of a rolling diaphragm 211.

Although in this figure only a single embodiment of the piston is shown, it will be appreciated that all the embodiments described with reference to the preceding figures may be used.

The pressure differences across the rolling diaphragms 208 and 211 may be controlled in manners similar to those described with reference to the preceding figures and hence are not shown in detail.

Obviously, in this machine, the amount of dead space cannot be controlled in accordance with the delivery. In such a cold-gas refrigerator, however, control may be effected in accordance with the temperature of the freezer. If this becomes excessively low, an amount of dead space is added by discharging liquid from the space between the pistons so that the absorption of thermal energy will decrease and the temperature will not fall any further. If the temperature in the freezer is too high, control is effected in the opposite direction. This provides simple control of a cold-gas refrigerator.

Figure 8:
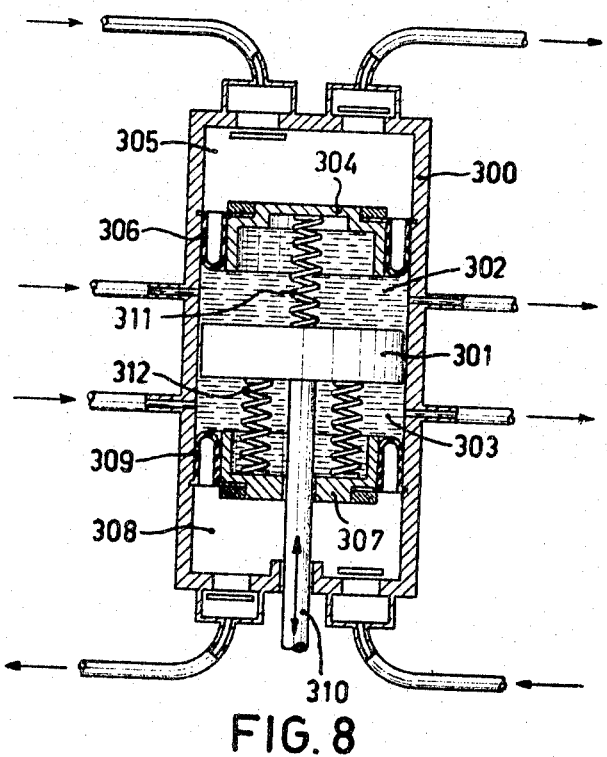
FIGURE 8 shows schematically a double-acting apparatus.

FIGURE 8 shows a double-acting apparatus. This apparatus has a cylinder 300. A double-acting piston 301 the two piston surfaces of which engage columns of liquid 302 and 303, respectively, is arranged to reciprocate in the said cylinder. The column of liquid 302 at its other end engages a piston 304. The surface of the piston 304 remote from the column of liquid 302 bounds a working space 305. The seal between the piston 304 and the cylinder 300 takes the form of a rolling diaphragm 305. The end of the column of liquid 303 remote from the piston 301 engages a piston 307 capable of varying the volume of a working space 308. The seal between the piston 307 and the cylinder 300 takes the form of a rolling diaphragm 309. The piston 301 is connected to a driving means (not shown) by a connecting rod 310.

To maintain a pressure difference across the rolling diaphragm 306 at least one compression spring 311 acts on the piston 304 so that the pressure in the column of liquid 302 is always lower than the pressure in the working space 305.

For a similar purpose pressure springs 312 are provided between the piston 301 and the piston 307.

The height of each column of liquid may be controlled in the manner described with reference to the apparatus of FIGURE 2. The control device is not shown in detail.

The seal between the connecting rod 310 and the piston 307 may be in the form of an O-ring, a rolling diaphragm or a bellows. This seal is not shown in detail in the drawing.

The apparatus shown is particularly suitable for use as a multistage compressor. The space 305 may be used as the first compression space and the space 308 as the second compression space.

From the foregoing it will be appreciated that the use of the invention provides, by comparatively simple means, a compact, reliable, and completely tight cylinder piston combination for compressors, expansion machines, hot-gas reciprocating engines and the like, which may be controlled by increasing the amount of dead space.

What is claimed is:

1. An apparatus for compressing or expanding a medium comprising at least one cylinder having a working space therein, a first piston-shaped member adapted to reciprocate in said cylinder whereby the volume of said working space is varied, a control device for said apparatus for regulating the relative volume variations of said working space by controlling the amount of dead space therein, a driving means, a second piston-shaped member coupled to said driving means, a rolling diaphragm, at least the seal between said first piston-shaped member and the adjacent wall of said cylinder being said rolling diaphragm, said rolling diaphragm being supported on at least one side by liquid, said control device being provided to maintain across said rolling diaphragm a pressure difference always in the same direction and substantially constant at least during each stroke, the space between said first and second piston-shaped members which contains a column of liquid being provided with an inlet and an outlet for said liquid by means of which the amount of liquid in said space may be varied, and said column of liquid being in completely unrestricted open communication with the liquid supporting said rolling diaphragm so that the pressure of said liquid supporting said rolling diaphragm and the pressure of the liquid column are equal.

2. An apparatus for compressing or expanding a medium as claimed in claim 1 wherein said apparatus is a compressor for handling a medium at a pressure below atmospheric pressure, and said rolling diaphragm has its convex side facing said working space.

3. An apparatus for compressing or expanding a medium comprising at least one cylinder having a working space therein, a first piston-shaped member adapted to reciprocate in said cylinder whereby the volume of said working space is varied, a control device for said apparatus for regulating the relative volume variations of said working space by controlling the amount of dead space therein, a driving means, a second piston-shaped member coupled to said driving means, a rolling diaphragm, at least the seal between said first piston-shaped member and the adjacent wall of said cylinder being said rolling diaphragm, said rolling diaphragm being supported on at least one side by liquid, at least one resilient element acting upon said first piston-shaped member to thereby exert a force thereon in a direction toward the space which the concave side of said rolling diaphragm faces, said control device being provided to maintain across each rolling diaphragm a pressure difference always in the same direction and substantially constant at least during each stroke, the space between said first and second piston-shaped members which contains a column of liquid being provided with an inlet and an outlet for said liquid by means of which the amount of liquid in said space may be varied.

4. An apparatus for compressing or expanding a medium as claimed in claim 3 wherein two piston-shaped members are located in said cylinder and further providing an interstice between the wall of said cylinder and one of said piston-shaped members, said rolling diaphragm arranged as a sealing member between said one piston-shaped member and the adjacent wall of said cylinder, one side of said rolling diaphragm forming part of the boundary of the compression space and its other side engaging the column of liquid between said two piston-shaped members, said resilient element exerting a force on said one of said piston-shaped members such that a pressure difference in the direction towards the concave side of said rolling diaphragm is produced across said diaphragm.

5. An apparatus for compressing or expanding a medium as claimed in claim 4 wherein the co-acting wall portion of said cylinder and said second piston-shaped member are stepped so that the resulting annular surfaces have equal areas.

6. An apparatus for compressing or expanding a medium as claimed in claim 1 wherein said apparatus is a compressor and is constituted of at least two cylinders, a pipe connecting the outlet of the first cylinder with the inlet of the second cylinder, a first diaphragm seal in the first cylinder between said piston capable of varying the volume of said working space and the adjacent wall of the cylinder having its convex side facing said working space, a second diaphragm seal in the second cylinder between said piston capable of varying the volume of said working space and the wall of said cylinder having its concave side facing said working space, a relatively small diameter pipe connecting the spaces under said rolling diaphragms in said first and second cylinders, and a single control unit which is connected to said spaces and maintains the same mean pressure in them, which mean pressure is higher than the mean pressure prevailing in the working space of said first cylinder and lower than the mean pressure prevailing in the working space of said second cylinder.

7. An apparatus for compressing or expanding a medium as claimed in claim 1 wherein two working spaces of variable volume are located in a cylinder, said piston-shaped member in said cylinder being double-acting, a drive means for said double-acting piston, each of the piston surfaces of the latter engaging a liquid column, a pair of further piston-shaped members each spaced from said double-acting piston and located at the end of each of said liquid columns remote from said double-acting piston, each of said further piston-shaped members being capable of varying the volume of one of said working spaces, a rolling diaphragm seal between each of said further piston-shaped members and the adjacent cylinder wall, and means being provided to maintain a substantially constant pressure difference across said rolling diaphragms while the space between each of said further piston-shaped members and the piston-shaped member coupled to said driving means is provided with an inlet and outlet for liquid thereby permitting the amount of liquid in each of the spaces to be varied.

References Cited by the Examiner
UNITED STATES PATENTS

| | | | |
|---|---|---|---|
| 1,650,377 | 11/1927 | Nixon | 103—44 |
| 2,261,911 | 11/1941 | Condit | 230—21 |
| 2,692,618 | 10/1954 | Ludowici | 92—98 |
| 2,731,192 | 1/1956 | Michels | 230—21 |
| 2,833,462 | 5/1958 | Scheerer | 230—21 |
| 3,204,858 | 9/1965 | Dros | 92—60 |

DONLEY J. STOCKING, *Primary Examiner.*

MARK NEWMAN, *Examiner.*

W. J. KRAUSS, *Assistant Examiner.*